June 15, 1954 N. E. ANDERSON 2,681,401
ARC WELDING APPARATUS
Filed Aug. 31, 1950 4 Sheets-Sheet 1

INVENTOR
NELSON E. ANDERSON
BY
ATTORNEYS

INVENTOR
NELSON E. ANDERSON
BY
ATTORNEYS

Patented June 15, 1954

2,681,401

UNITED STATES PATENT OFFICE 2,681,401

ARC WELDING APPARATUS

Nelson E. Anderson, Berkeley Heights, N. J., assignor to Air Reduction Company, Incorporated, a corporation of New York Application August 31, 1950, Serial No. 182,488

12 Claims. (Cl. 219—8)

This invention relates to arc welding apparatus and more particularly to improved apparatus for feeding filler wire to the weld when performing inert gas shielded arc welding.

In an inert gas shielded arc welding method in which a non-consuming electrode is employed the heat produced by the arc is extremely intense and therefore in that kind of welding method the satisfactory addition of filler metal has been an important problem. In manual welding the filler metal is usually added by holding a relatively large diameter filler wire or rod so that its end just reaches the work in the welding zone within the gas shield. The wire is held at a relatively steep angle to the work, and as a segment of it melts off, the wire is withdrawn momentarily as the molten filler metal is worked into the weld. Then the filler wire is re-introduced to the welding zone and the process repeated again and again as the weld progresses. The wire is always held in front of the arc (along the line of weld) but is never allowed to project into the arc. Some attempts have been made in the past to duplicate this intermittent manual feeding of the filler wire in an automatic welding machine but this necessitates the use of complicated mechanism and is generally unsatisfactory.

According to the present invention apparatus is provided for automatically feeding filler wire to the welding zone but in operation it deviates from the principle of intermittent introduction of the filler wire and feeds it at a uniform rate.

However even when the filler wire is fed at a uniform rate this does not of itself assure a uniform sound deposit of the filler metal in the weld. It has been found that to accomplish this the filler wire should be of relatively small diameter and should be fed to the weld at a relatively high rate, and moreover the filler wire should be fed at the proper angle to the work and so that its end is in contact with the work at the leading edge of the weld puddle. When the wire size, wire feed speed, and welding current are properly correlated and the wire is fed to the correct location relative to the weld puddle and the arc, a uniform sound deposit of the weld metal can be obtained, otherwise it has been found that the wire melts off intermittently, too much being melted at a time and each melting period being followed by a no-melting period during which the wire is feeding toward the work for further melting, thus causing the weld metal to be deposited intermittently in large drops or globules instead of continuously and uniformly.

An object of this invention is to provide improved filler wire feeding and positioning apparatus adapted to handle a filler wire of relatively small diameter and having the necessary adjustability and other features to enable the filler wire to be so fed to the welding zone as to produce the above desirable results.

Another object is to provide an improved welding wire feeding apparatus adapted to feed welding wires of relatively small diameter and relatively soft composition to a welding operation uniformly and reliably.

Another object is to provide filler wire feeding apparatus having improved adjustable positioning mechanism for the end of the wire which is capable of preliminary rough adjustment, and fine adjustment while the welding operation is in progress so that the critical positioning of the end of the wire in the welding zone can be effected.

Another object is to provide an improved filler wire feeding and positioning apparatus in which arcing to the wire is prevented when the wire is out of contact with the work.

A further object of the invention is to provide an improved reel support which although especially useful and advantageous in apparatus for feeding filler wire can also be used, if desired, to support a reel of wire constituting a consuming electrode.

These and other objects that will appear from the following description are achieved by the apparatus illustrated in the accompanying drawings and hereinafter described. In the drawings.

Figure 1:
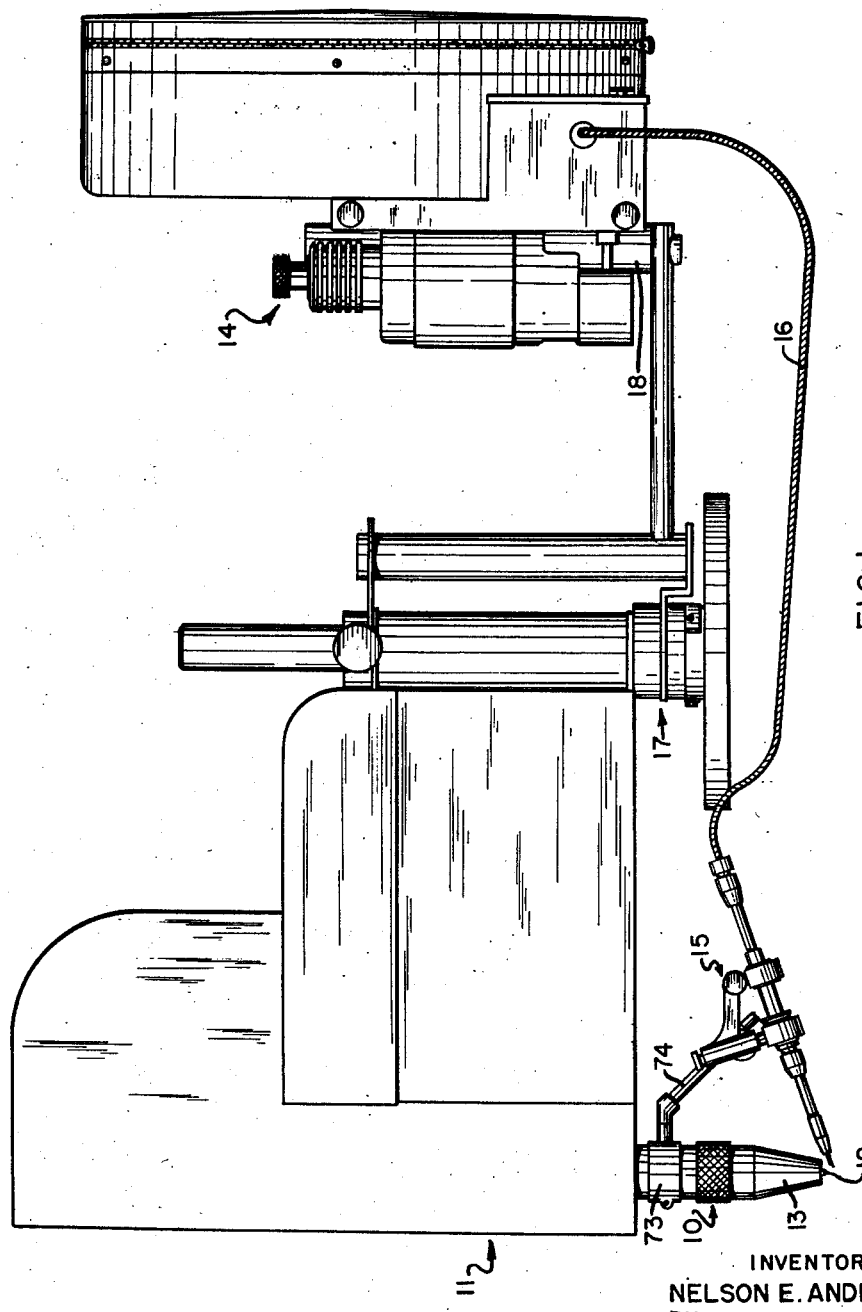
Figure 1 is a side elevation of an automatic welding head adapted for use in gas shielded arc welding with a nonconsuming electrode, and complete filler wire feeding and positioning apparatus embodying the invention.

Figure 1 shows the complete filler wire feeding and positioning apparatus associated with an arc welding torch or electrode holder 10 carried by an automatic head represented at 11. The welding torch may be of any suitable type adapted to hold an electrode whose tip appears at 12. Fig. 1 represents the welding torch as of that type usually employed in automatic gas shielded arc welding operations, since the filler wire feeding and positioning apparatus of the invention was designed especially for use in connection with welding equipment for performing that kind of welding. The welding torch shown in Fig. 1 therefore holds an electrode of the non-consuming type, such as a tungsten electrode, and has a gas nozzzle 13 from which a stream of inert gas, such as helium or argon, is discharged to provide a protective gas shield which blankets the tip of the electrode, the arc, and the weld puddle. However it should be understood that the wire feeding and positioning apparatus of the invention may, if desired, be used in connection with welding equipment having no provision for supplying a shielding gas, or in connection with an electrode holder through which a consuming metal-depositing electrode is fed towards the work in case it is desired to supply additional filler metal to the weld.

Further, the wire feeding apparatus of this invention has been found to be particularly useful for feeding an electrode to the arc in metal arc welding, where the electrode is a continuous consuming wire of relatively small diameter. An example of such an application of the present invention is in using the wire feeding apparatus disclosed and claimed herein to feed the electrode wire to a welding gun such as that disclosed in Fig. 2 of the Muller et al. Patent Number 2,504,868. In consumable electrode welding of this type the electrode fed through the gun by the wire feeding device serves as one terminal of the welding arc as well as providing filler metal so that auxiliary filler metal is not required.

In Fig. 1 the filler wire feeding unit is denoted in general by the reference numeral 14, the wire positioning mechanism by the numeral 15, and the flexible conduit through which the filler wire is pushed by the feed unit to the positioning mechanism is shown at 16. The entire apparatus is supported by a stand or base 17 which may be stationary if provision is made for moving the work to provide the necessary relative motion between the welding torch and the work to produce the weld, or it may be mounted on a movable carriage if the work is stationary and the welding torch is moved along the line of the weld. The wire feed unit 14 may be supported on a tubular post 18 which in turn is supported by the base 17, as shown, although this particular way of supporting the wire feed unit is of no special significance.

Figure 2:
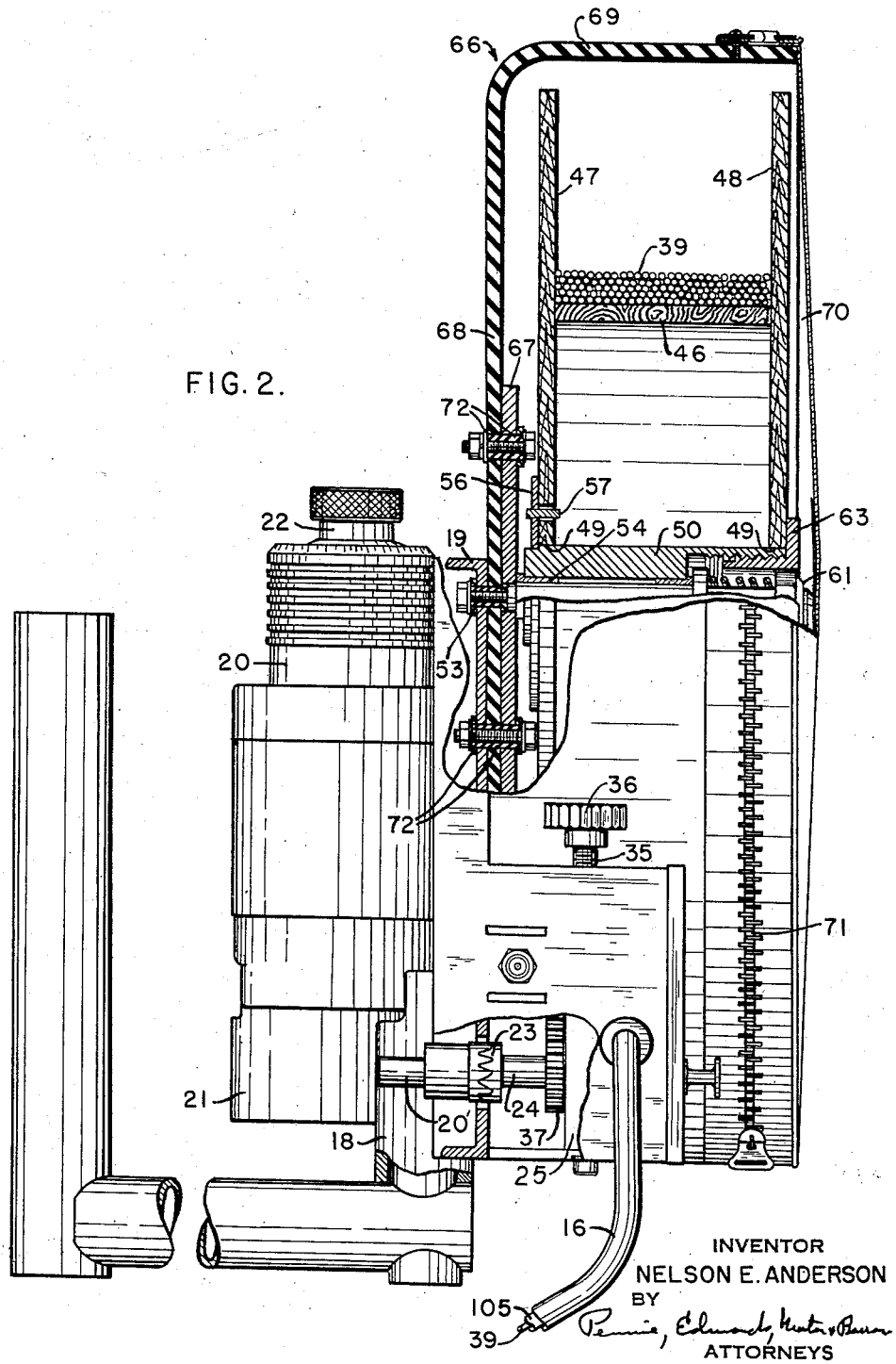
Fig. 2 is a side elevation, partly in vertical section, of the filler wire feeding unit alone, this figure being drawn on a larger scale than Fig. 1.
Figure 4:
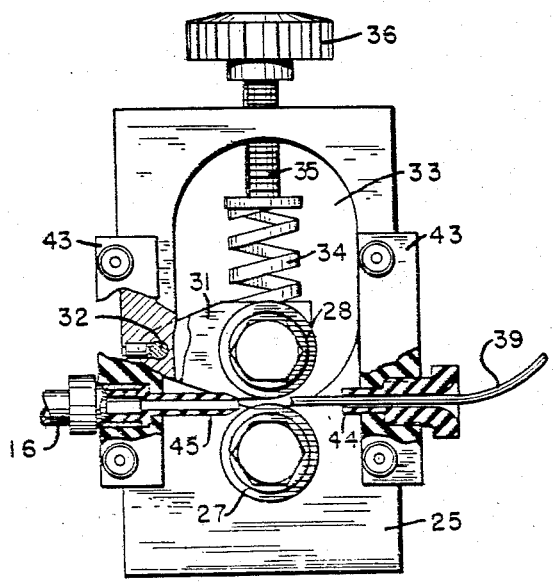
Fig. 4 is a side elevation, partly in vertical section, of the filler wire feed roll unit.
Figure 5:
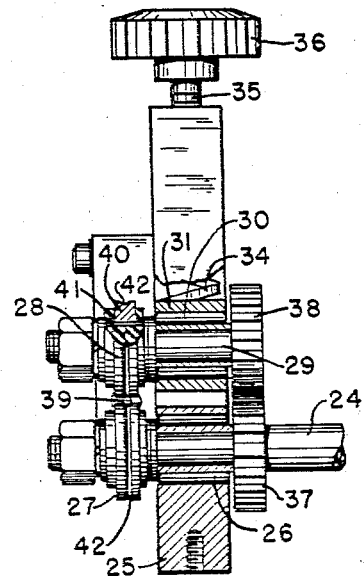
Fig. 5 is an end elevation, partly in vertical section, of the feed roll unit shown in Fig. 4.

The wire feed unit is shown by itself and in more detail in Fig. 2. It comprises a main frame 19 supported by the post 18. An electric motor 20 is carried by the frame 19 and drives a shaft 20' through reduction gearing in a gear box 21. The motor is provided with an adjustable speed control governor 22 which may be set to cause the motor to drive the shaft 20' at a pre-selected constant speed. The shaft 20' is mechanically coupled by coupling 23 to the shaft 24 of the feed roll unit best illustrated in Figs. 4 and 5. Referring to these figures this unit comprises a plate 25 supported by the frame 19 and in which the shaft 24 is journalled by means of a suitable bearing 26 preferably of the needle or roller type. A wire feed roll 27 is fixed to the shaft 24 at one side of the plate 25. A second cooperating feed roll 28 is fixed to a shaft 29 which is journalled by means of a bearing 30 in a rocker arm 31 pivotally connected to the plate 25 by means of a pin 32 (Fig. 4). The rocker arm 31 operates in an opening 33 provided in the plate 25 and a coil spring 34 bears down on the rocker arm and reacts at its upper end against an adjusting screw 35 which may be turned by means of a knob 36. Thus the feed roll 28 is a floating roll and is yieldingly urged by the spring 34 toward the fixed feed roll 27. At the side of the plate 25 opposite the feed rolls 27 and 28 the feed roll shafts 24 and 29 are interconnected by gears 37 and 38, the gear 37 being fixed to the shaft 24 and the gear 38 being fixed to the shaft 29. Thus when the shaft 24 is driven by the motor 20 both feed rolls are positively driven. The filler wire 39 passes between the two feed rolls and is drawn by them from the reel hereinafter described and pushed by them to the wire positioning mechanism also later described. Each of the feed rolls has a steel tread 40 (Fig. 5) mounted on a hub portion 41 of hard insulating material which in turn is fixed to the shaft which carries the feed roll. The treads of the feed rolls are circumferentially grooved as shown at 42 to receive and guide the filler wire but they are otherwise smooth.

Smooth rolls are essential where soft flexible wires are used, such as $\frac{1}{16}$ inch diameter aluminum wire. If knurled rolls are employed the surface of the wire is deformed by the rolls and the frictional forces between the surface of the wire and the guides and conduit which resist feeding are thereby greatly increased. This increases the tendency of small diameter wire to feed intermittently or to jam in the apparatus and spoil the weld. Also where the wire being fed is a consuming electrode into which a relatively high welding current is introduced (for instance as disclosed in Muller et al. Patent Number 2,504,868) the irregular surface left by knurled rolls increases contact resistance and causes arcing and excessive heating at the contact element. When smooth tread rolls are employed it becomes essential to make both feed rolls driven rolls as shown; if a single driven roll and an idler roll are employed the wire is not fed with the positive uniform force required for satisfactory welding.

The gears 37 and 38 are of the type which will remain in driving engagement throughout the small range of movement of the rocker arm 31. Spring 34 maintains a constant pressure between the feed rolls to assure adequate friction for uniform and uninterrupted wire feeding. This pressure may be varied at will by turning the knob 36 to adjust the screw 35.

Blocks 43 of insulating material are mounted on the plate 25 to support wire guides 44 and 45 also made of insulating material. The guide 44 guides the filler wire 39 to the pass between the feed rolls and the guide 45 guides the filler wire after it leaves the pass and directs it into the above-described flexible cable 16 which guides it to the wire positioning mechanism 15 (Fig. 1). It has been found essential in the feeding of fine wires, especially those of low strength such as aluminum, that the wire guide 45 extend to a point very close to the point at which the wire is gripped by the feed rolls, so that the unsupported length of the wire is kept to a minimum. The necessity for such a construction results from the tendency of the wire to buckle when the unsupported length between the contact point of the feed rolls and the wire guide entrance is excessive. In this invention, in which double driven smooth tread rolls are employed, the unsupported length of wire preferably is limited to that length which will not buckle under the longitudinal compressive force frictionally applied to the wire by the rolls. More specifically, this means that the unsupported length of wire between the rolls and the wire guide must be short enough so the rolls will slip on the wire (overcome friction) before the wire will buckle. If these relations are maintained satisfactory operation is assured. For example, it has been found that when double driven smooth tread rolls are employed to feed 1/16 inch aluminum wire through a flexible conduit as shown, the maximum unsupported length of wire that can be tolerated is about 1/4 inch.

Figure 3:
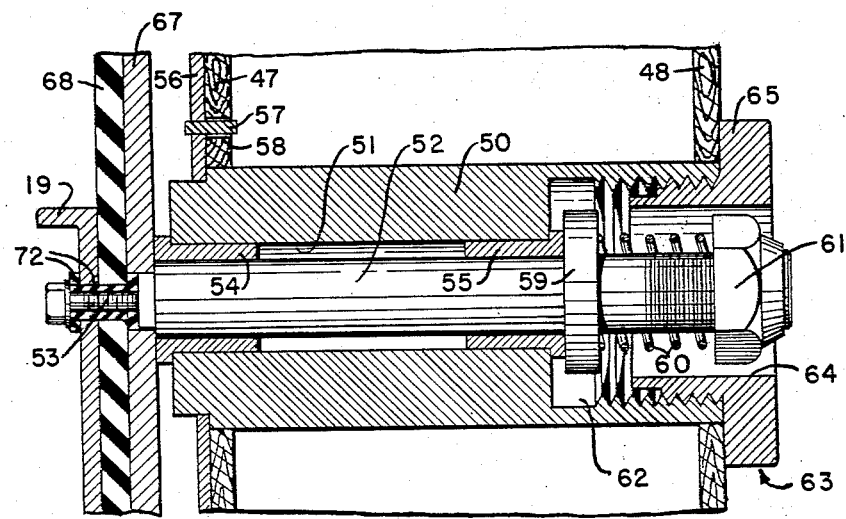
Fig. 3 is a vertical section through the reel support and a portion of the reel.

The filler wire 39 is withdrawn by the feed rolls 27 and 28 from a reel or spool on which it is wound. The reel is shown in Fig. 2 and may be of any suitable type having an axial opening by which the reel may be slid onto the reel supporting hub hereinafter described. The reel may comprise a hollow cylinder or drum portion 46 on which the filler wire 39 is wound and positioned between and secured to a pair of side discs or flanges 47 and 48. The drum portion 46 is coaxial with the discs and the discs extend radially outward beyond the drum portion as shown in Fig. 2 to confine the filler wire between them. Each disc has a central opening 49, so that the reel may be slipped laterally onto a rotatable hub 50. This hub and the manner in which it is supported are best shown in Fig. 3. The hub 50 has a central opening 51 to receive a stationary spindle 52 which is secured at one end to the frame 19 by a bolt 53. A pair of bushings 54 and 55 force fit in the central opening of the hub 50 rotate with the hub and serve to rotatably mount the hub on the fixed spindle 52. A flange 56 welded or otherwise secured to the hub 50 acts as a positioning stop for the reel when it is slipped over the hub. This flange carries an inwardly projecting drive pin 57 which engages in a hole 58 in the side disc 47 of the reel causing the reel and hub 50 to turn as a unit as the filler wire is withdrawn from the reel. A collar or washer 59 positioned on the spindle 52 outwardly of the bushing 55 is spring pressed against the end face of this bushing by a coil spring 60 surrounding the outer end portion of the spindle. This collar 59 may be keyed to the spindle to prevent rotation while permitting free movement longitudinally of the spindle. The spring 60 is compressed between the collar 59 and an adjusting nut 61 threaded on the outer end of the spindle. The pressure exerted by the collar 59 against the end of bushing 55 provides sufficient frictional drag on the hub 50 to prevent the occurrence of backlash as the filler wire is withdrawn from the reel. This drag is adjustable by turning the nut 61.

The central opening through the hub 50 is enlarged at the outer end of the hub as shown at 62 and this portion of the opening is internally threaded to receive an externally threaded annular hub nut 63 having a central opening 64 extending through it. This nut has a flange 65 which retains the reel on the hub 50 when the nut is in position. The outer end portion of the spindle 52, the collar 59, nut 61, and coil spring 60, are housed in the enlarged portion 62 of the central hub opening and the opening 64 through the hub nut 63. To position a reel of wire on the hub 50 it is only necessary to remove the hub nut 63, slip the reel on the hub until the inner disc 47 of the reel is in engagement with the flange 56 on the hub and the drive pin 57 engages in the hole 58 in the reel disc 47, and then replace the hub nut. When the supply of filler wire is exhausted the hub nut 63 is removed and the empty reel is withdrawn from the hub 50. The reel in its entirety may be made of some inexpensive material such as wood and discarded when empty and replaced by another reel wound with a fresh supply of filler wire, or the empty reel may be rewound with filler wire, if desired, instead of being discarded.

A reel protective case 66 (Fig. 2) and a backing plate 67 are bolted to each other and to the frame 19. The rear wall 69 of the case 66 and its peripheral cylindrical wall 68 are preferably made of transparent plastic. The front wall 70 is preferably a fabric cover with a slide-fastener 71 of the zipper type. To position or remove a reel it is, of course, necessary to open the zipper fastener 71 and move the fabric cover out of the way to give access to the interior of the protective case. When the fabric cover is closed the reel is completely enclosed in the protective case 66. It is highly beneficial to the welding operation to keep the wire 39 clean.

The reel and hub assembly is electrically insulated from the frame 19 by the use of insulating washers and bushings in connection with all bolts that attach the assembly to the frame as shown at 72 in Figs. 2 and 3.

Thus it may be seen that provision is made for supporting a reel of filler wire on a rotatable hub and for mechanically withdrawing the wire from the reel by means of a speed-governed motor and the feed rolls it drives, a regulated friction drag or braking action being applied to the hub during its rotation to prevent backlash.

Figure 6:
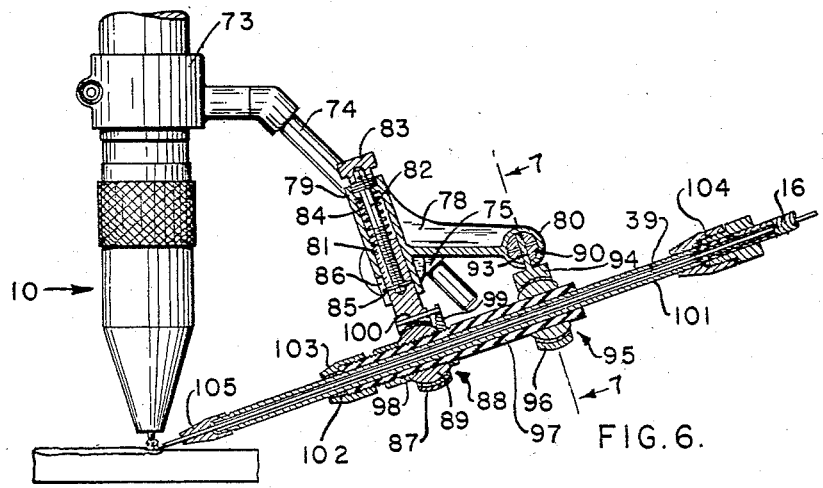
Fig. 6 is a side elevation, partly in vertical section, of the filler wire positioning mechanism.
Figure 7:
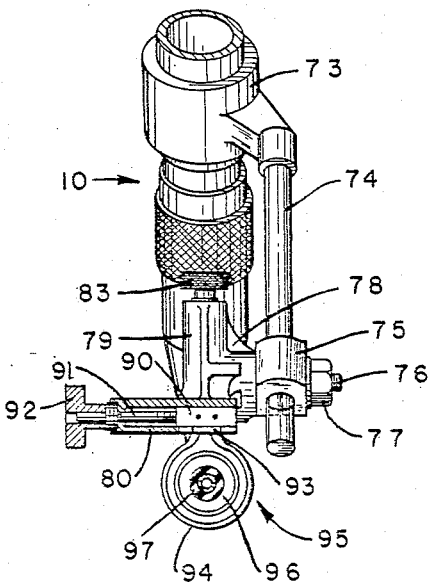
Fig. 7 is a vertical section taken along line 7—7 of Fig. 6.

As the filler wire leaves the feed rolls 27—28 it is pushed by them through the above-mentioned wire guide 45 (Fig. 4) and the flexible cable 16 to the wire positioning mechanism. This mechanism is best illustrated in Figs. 6 and 7. It comprises a main supporting bracket, having a collar 73 which may be clamped on the barrel of the welding torch 10 and a clamping rod 74 carried by the collar and projecting downwardly and outwardly from it, and the following-described parts supported by the rod 74 of the bracket. A split clamp 75 (Fig. 7) is slidably mounted on the rod 74 and is provided with a clamping bolt 76 and nut 77 so that it may be clamped in any desired position on the rod 74. A second bracket 78 is clamped to the split clamp 75 when the nut 77 is tightened but when the nut 77 is loosened the bracket may be rotated about the axis of the bolt 76. The bracket 78 has two hollow cylindrical portions 79 and 80 perpendicularly related but in different planes. A slide or piston 81 (Fig. 6) is slidable within the hollow cylinder 79 and is provided at its upper end with an axial threaded bore to receive the threaded lower end of an adjusting screw 82. The upper end of the screw 82 is provided with a knurled knob 83 by which it can be turned. Turning of this thumb screw 82—83 produces axial movement of the piston 81 in the hollow cylinder 79. A coil spring 84 is compressed between the upper end of the piston 81 and the closed upper end of the hollow cylinder to retain the parts in their operating positions. A guide pin 85 fitting in and extending transversely of the piston 81 projects at one end beyond the piston and rides in a slot 86 in the side wall of the hollow cylinder 79 thereby preventing rotation of the piston when the adjusting screw 82 is turned. The lower end of the piston 81 projects out of the lower end of the hollow cylinder 79 and is provided with the socket member 87 of a ball-and-socket type universally adjustable bearing or joint 88 the ball member of which is shown at 89.

The other hollow cylinder 80 similarly contains a slidable piston 90 which may be adjusted axially in the cylinder by an adjusting thumb screw having a screw portion 91 and a knurled knob 92 (Fig. 7). In this case the lower wall of the hollow cylinder 80 has a slot through which projects an arm 93 that is secured to the piston and that carries the socket member 94 of a second ball-and-socket type universally adjustable bearing or joint 95 the ball member of which is shown at 96, as best seen in Fig. 6.

A tubular guide 97 of insulating material passes through and is supported by the two ball members 89 and 96 of the two ball-and-socket bearings above described. The tubular guide 97 is free to slide in the ball member 96 of the bearing 95 but it is fixed to the ball member 89 of the bearing 88. To effect this the portion of the tubular guide 97 which passes through the ball member 89 is threaded and the ball member is clamped thereto by means of clamping and positioning nuts 98 and 99 screwed onto the threaded portion of the tubular guide and located at opposite sides of the ball member. The clamping nut 99 is restrained from rotating by a pin 100.

A tube 101 fits inside of the tubular guide 97. A split collar 102 with a tapered exterior seat locks the tube 101 in position in the guide 97 when a clamping nut 103 having a correspondingly tapered interior seat is screwed up tight on the lower end of the guide 97. The flexible cable 16 through which the filler wire is pushed by the above-described feed rolls is connected to the upper end of the tube 101 by means of a fitting 104. Thus the filler wire is guided by the flexible cable into the interior of the tube 101. The lower end of the tube 101 is provided with a tip 105 having an axial hole through which the filler wire passes with a close fit so that the filler wire is very accurately guided at its end.

When the collar 73 is properly positioned on the welding torch, the two ball-and-socket bearings or swivel connections 88 and 95 support the tubular guide 97 and the wire tube 101 in advance of the torch at an angle to the work surface and so that the filler wire will point in the direction of the arc.

As previously stated the tubular guide 97 is made of insulating material and therefore prevents any possible flow of current from the filler wire to ground through the wire positioning mechanism. The flexible cable 16 has an insulating liner 105 (Fig. 2) for the same purpose. Since the reel and hub assembly and the feed rolls are also insulated, as above described, the filler wire in its entirety is electrically floating. This eliminates the possibility of accidental arcing from the electrode to the filler wire except, of course, while the wire is in contact with the work and then the wire would melt back off the work in an instant and the arc would be extinguished without damage.

It may now be seen that relatively simple and satisfactory apparatus has been provided for mechanically feeding filler wire from a supply reel to the weld at any desired constant rate.

The filler wire may be directed to the exact spot desired under the welding head. The various adjustments which make this exact positioning of the wire possible are as follows: (1) collar 73 may be clamped on the welding torch in any desired position; (2) split clamp 75 may be moved up or down and around rod 74 and secured at any desired position; (3) bracket 78 may be clamped at any angular position relative to split clamp 75; and (4) the filler wire tube 101 may be adjusted to project any desired amount from the tubular guide 97 by loosening and retightening clamping nut 103. The foregoing are all rough adjustments which may be made before welding is begun. While the welding operation is in progress micro-adjustment of the wire positioning mechanism may be made by turning the thumb screws 82—83 and 91—92 (Figs. 6 and 7). With the apparatus set as illustrated turning the thumb screw 82—83 produces fine vertical adjustment of the end of the filler wire because it gradually swings tubular guide 97 about the ball-and-socket bearing 95 as a fulcrum or center. Turning the thumb screw 91—92 produces fine horizontal adjustment of the end of the filler wire because it gradually swings tubular guide 97 about the ball-and-socket bearing 88 as a center. Thus the ball-and-socket universal bearing or joint 95 serves as a fulcrum when the inner end of the tubular guide 97 is adjusted vertically by turning knob 83, and the other ball-and-socket universal bearing or joint 88 serves as a fulcrum when the inner end of the tubular guide 97 is adjusted horizontally by turning the knob 92.

The rough adjustments make it possible to preliminarily locate the wire positioning mechanism at the proper side of the torch (preferably in advance of the torch) and to approximate the desired orientation and angularity of the filler wire tube 101 and the location of its delivery end. The filler wire tube should preferably be at an angle of from 10 to 15° with the work surface and it should preferably be in line with the direction of travel. The micro-adjustments or fine adjustments by the thumb screws 82—83 and 91—92 make it possible while the welding operation is in progress to so position the delivery end of the filler wire tube 101 that the end of the wire is maintained at the exact spot desired which is preferably in contacting relation with the work at the leading edge of the weld puddle.

Other advantageous features of the apparatus which it is desired to emphasize are as follows:

The adjustment of the frictional drag on the reel hub 50 that prevents backlash is not altered when a reel is removed or replaced since the frictional drag is adjusted by turning the nut 61 and this nut is not disturbed when a reel is removed or replaced, it being only necessary to remove and replace the hub nut 63. While the use of the coil spring 60 in connection with the parts that produce the frictional drag on the hub 50 is advantageous in most cases, it can be omitted if desired and the nut 61 caused to bear directly against the collar 59 or even directly against the end of the bushing 55. The nut 61 is easily accessible and therefore the frictional drag on the hub 50 may be easily and quickly adjusted at any time.

Since the feed rolls have smooth treads, except for the circumferential groove in each, they do not deform the wire or pick up any metal from the filler wire that would interfere with satisfactory feeding of the wire. However, despite their smooth treads they feed the filler wire uniformly and continuously because they are both positively driven and because the pressure exerted by them on the wire can be regulated to provide adequate friction. If the movement of the wire is impeded in any way, the pressure may be adjusted to a value below that which would cause damage to any part of the apparatus. The feed rolls will accommodate themselves to wires of different diameters (within a limited range) and for that range the driving gears 37 and 38 will maintain the driving connection from one feed roll to the other.

Satisfactory welds have been made with welding equipment having filler wire feeding, guiding, and positioning mechanism of the kind herein described under conditions of which those shown by the following table are illustrative:

| Material | Filler Wire | | Welding Current, amps. | Plate Thickness, in. | Travel Speed, in./min. |
| --- | --- | --- | --- | --- | --- |
| | Size, in. dia. | Feed Speed, in./min. | | | |
| Type 304 Stainless Steel | 1/16 | 35 | 250 | 1/8 | 20 |
| Aluminum | 1/16 | 55 | 235 | 1/16 | 40 |
| Do | 1/16 | 90 | 260 | 1/8 | 36 |
| Mild Steel | 1/16 | 60 | 290 | .040 | 80 |

The above data is for single pass welds. Multiple pass welds may be made with welding currents up to 625 amperes and wire feed speeds up to 210 inches per minute.

I claim:

1. In arc welding apparatus having an electrode holder and means for feeding filler wire to the welding zone, positioning means for the end of the filler wire comprising a tubular guide through which the wire is fed to the welding zone, a bracket structure attached to the electrode holder, a pair of swivel connections by which the tubular guide is supported from the bracket structure, said swivel connections being spaced apart longitudinally of the tubular guide and serving to support it so that it points towards the welding zone at an angle to the work surface, means for adjusting the position of one of said swivel connections relative to the bracket structure in one direction while the second swivel connection serves as a fulcrum point about which the tubular guide swings during such adjustment, and means for adjusting the position of the second swivel connection relative to the bracket structure in a direction substantially at right angles to said first-mentioned direction while the first swivel connection serves as a fulcrum point about which the tubular guide swings during such adjustment.

2. In arc welding apparatus having an electrode holder and means for feeding filler wire to the welding zone, positioning means for the end of the filler wire comprising a tubular guide through which the wire is fed to the welding zone, a bracket structure attached to the electrode holder, a pair of universal joints between the bracket structure and the tubular guide by which the guide is supported from the bracket structure, said universal joints being spaced apart longitudinally of the tubular guide and serving to support it so that it points towards the welding zone at an angle to the work surface, means for adjusting the position of one of said universal joints relative to the bracket structure in one direction while the second universal joint serves as a fulcrum point about which the tubular guide swings during such adjustment, and means for adjusting the position of the second universal joint relative to the bracket structure in a direction substantially at right angles to said first-mentioned direction while the first universal joint serves as a fulcrum point about which the tubular guide swings during such adjustment.

3. In arc welding apparatus having an electrode holder and means for feeding filler wire to the welding zone, positioning means for the end of the filler wire comprising a tubular guide through which the wire is fed to the welding zone, a pair of ball-and-socket bearings in which said guide is supported at points spaced apart longitudinally of the guide, a bracket structure attached to the electrode holder and supporting said bearings so that the tubular guide points towards the welding zone at an angle to the work surface, means for adjusting the position of one of said bearings relative to the bracket structure in a generally vertical direction while the second bearing serves as a fulcrum about which the tubular guide swings during such adjustment, and means for adjusting the position of the second bearing relative to the bracket structure in a generally horizontal direction while the first bearing serves as a fulcrum about which the tubular guide swings during such adjustment.

4. In arc welding apparatus having an electrode holder and means for feeding filler wire to the welding zone, positioning means for the end of the filler wire comprising a tubular guide through which the wire is fed to the welding zone, a main bracket adjustably attached to the electrode holder, a downwardly projecting rod on said bracket, a clamp whose position is adjustable along and around said rod, a second bracket swivelly supported by said clamp, a swivel connection between one portion of said second bracket and the tubular guide, a second swivel connection between another portion of such bracket and the tubular guide, said swivel connections being spaced apart longitudinally of the tubular guide and serving to support it so that it points towards the welding zone at an angle to the work surface, means for adjusting the position of the first swivel connection on said second bracket in one direction while the second swivel connection serves as a fulcrum point about which the tubular guide swings during such adjustment, and means for adjusting the position of the second swivel connection on said second bracket in a direction substantially at right angles to said first-mentioned direction while the first swivel connection serves as a fulcrum point about which the tubular guide swings during such adjustment.

5. Arc welding apparatus in accordance with claim 4 in which the means for adjusting the position of each of said swivel connections is micro-adjusting means.

6. In arc welding apparatus having an electrode holder and means for feeding filler wire to the welding zone, positioning means for the end of the filler wire comprising a tubular guide through which the wire is fed to the welding zone, a bracket structure attached to the electrode holder, a pair of ball-and-socket joints between the bracket structure and the tubular guide by which the guide is supported from the bracket structure, said ball-and-socket joints being spaced apart longitudinally of the tubular guide and the ball members of the joints being each provided with a central opening through which the tubular guide passes, the ball-and-socket joints serving to support the tubular guide so that it points towards the welding zone at an angle to the work surface, a thumb-screw connection between the socket member of one ball-and-socket joint and the bracket structure for producing micro-adjustment of the position of such joint relative to the bracket structure in one direction while the second ball-and-socket joint serves as a fulcrum about which the tubular guide swings during such adjustment, and a thumb-screw connection between the socket member of the second ball-and-socket joint and the bracket structure for producing micro-adjustment of the position of such joint relative to the bracket structure in a direction substantially at right angles to said first-mentioned direction while the first ball-and-socket joint serves as a fulcrum about which the tubular guide swings during such adjustment.

7. Arc welding apparatus comprising an electrode holder, a reel support for a reel of filler wire to be fed to the welding zone, a filler wire guide supported by the electrode holder for directing the end of the wire to the welding zone, and a pair of motor-driven feed rolls between which the filler wire passes for withdrawing the wire from the reel and pushing it through said guide to the welding zone, each of said rolls having a hub portion made of electric insulating material and a smooth circumferentially grooved metallic tread portion.

8. Arc welding apparatus comprising an electrode holder, a reel support, a reel supported by the reel support and containing a supply of wire to be fed to the welding zone, a pair of motor-driven feed rolls between which the wire passes for withdrawing the wire from the reel and pushing it to the welding zone, said reel support comprising a stationary spindle fixedly supported at one end, a hub structure having an axial opening by which it is rotatably mounted on the spindle, means for producing a frictional drag on the hub structure during its rotation including an adjusting nut having threaded engagement with the distal end of the spindle, the reel having an axial opening by which it may be slipped onto the hub structure, and an annular hub nut having threaded engagement with a portion of the hub structure for retaining the reel on the hub structure, the central opening of said annular hub nut being large enough to clear said adjusting nut whereby the annular hub nut may be removed to permit removal or replacement of the reel without disturbing the adjusting nut and the degree of frictional drag produced by it on the hub structure.

9. Arc welding apparatus in accordance with claim 8 in which the axial opening in the hub structure is enlarged at its outer end and is internally threaded, said annular hub nut having an externally threaded portion received by such internally threaded portion of the hub structure's axial opening, and the means for producing the frictional drag on the hub structure being housed in said enlarged portion of the hub structure's axial opening and in the central opening of the annular hub nut.

10. Arc welding apparatus in accordance with claim 9 in which the means for producing the frictional drag on the hub structure includes in addition to said adjusting nut a collar on said spindle engaging a part of the rotatable hub structure and a coil spring compressed between such collar and the adjusting nut, said collar and spring and adjusting nut and the distal end portion of the spindle on which they are located being housed in said enlarged portion of the hub structure's axial opening and in the central opening of the annular hub nut.

11. Arc welding apparatus comprising an electrode holder, a reel support, a reel supported by the reel support and containing a supply of wire to be fed to the welding zone, a pair of motor-driven feed rolls between which the wire passes for withdrawing the wire from the reel and pushing it to the welding zone, said reel support comprising a stationary spindle fixedly supported at one end, a hub structure having an axial opening by which it is rotatably mounted on the spindle, the reel having an axial opening by which it may be slipped on the hub structure, means preventing relative rotation between the reel and the hub structure, a hub nut having threaded engagement with a portion of the hub structure for retaining the reel on the hub structure, and adjustable means independent of said hub nut for producing a frictional drag on the hub structure during its rotation.

12. In a welding machine in which an arc is maintained between an electrode and a workpiece and filler wire is fed to the weld puddle produced by said arc, the combination with an electrically conductive main frame of a reel support, a reel rotatably mounted on said reel support and electrically insulated from said main frame and adapted to hold a coiled length of filler wire, feed rolls including treads electrically insulated from said main frame adapted to engage said wire to withdraw said wire from said reel and feed said wire to said weld puddle, means for rotating said feed rolls, and wire guides consisting of electrically conductive portions and electrically non-conductive portions cooperating to guide said wire as it passes from said reel through said feed rolls to said weld puddle, said conductive portions of said wire guides being electrically insulated from said main frame.

References Cited in the file of this patent

UNITED STATES PATENTS

| Number | Name | Date |
|---|---|---|
| 1,475,189 | Krebs | Nov. 27, 1923 |
| 1,477,538 | Carter et al. | Dec. 18, 1923 |
| 1,580,020 | Cutler et al. | Apr. 6, 1926 |
| 1,644,237 | Christensen | Oct. 4, 1927 |
| 1,884,714 | Jerabek | Oct. 25, 1932 |
| 1,953,915 | Burgett et al. | Apr. 3, 1934 |
| 1,989,691 | Hirt | Feb. 5, 1935 |
| 2,016,043 | Lincoln | Oct. 1, 1935 |
| 2,032,260 | Chapman | Feb. 25, 1936 |
| 2,059,089 | Clesi et al. | Oct. 27, 1936 |
| 2,079,956 | Brugett | May 11, 1937 |
| 2,093,881 | Conrad | Sept. 21, 1937 |
| 2,189,399 | Lewbers | Feb. 6, 1940 |
| 2,272,158 | Anderson | Feb. 3, 1942 |
| 2,344,775 | Holslag | Mar. 21, 1944 |
| 2,360,160 | Pickhaver | Oct. 10, 1944 |
| 2,405,446 | Perrault | Aug. 6, 1946 |
| 2,445,607 | Ghetto | July 20, 1948 |
| 2,483,897 | Godfrey | Oct. 4, 1949 |